Jan. 21, 1969 D. W. ZIELKE 3,423,039

MAGNETIC TAPE CARTRIDGE

Filed April 10, 1967 Sheet 1 of 2

INVENTOR
DARRELL W. ZIELKE

BY Cullen, Sloman, & Cantor
ATTORNEYS

Jan. 21, 1969 D. W. ZIELKE 3,423,039

MAGNETIC TAPE CARTRIDGE

Filed April 10, 1967 Sheet 2 of 2

INVENTOR
DARRELL W. ZIELKE

BY Cullen, Sloman, & Cantor
ATTORNEYS

3,423,039
MAGNETIC TAPE CARTRIDGE

Darrell W. Zielke, Madison Heights, Mich., assignor, by mesne assignments, to Troy National Bank, Troy, Mich.

Filed Apr. 10, 1967, Ser. No. 629,640
U.S. Cl. 242—55.19 6 Claims
Int. Cl. B65h 17/48

ABSTRACT OF THE DISCLOSURE

A single reel magnetic tape system includes tape tension adjusting means which provide relatively constant tape tension by producing a tension-reducing effect in response to high tension conditions. The tape rests on a substantially rigid annular Mylar wafer which in turn is supported by and projects radially beyond a sloping flange of the tape reel hub. The outer portion of the tape-supporting wafer slides on a series of concentric bearing ridges in the floor of the tape cartridge. When tape tension increases, the geometry of the wafer and hub flange cause an inward and downward force to be applied against the inner portion of the wafer. The hub flange edge acts as a fulcrum, and the downward force of the tape pile against the inner edge of the wafer produces a tendency for the outer portion of the wafer to rock upward about the fulcrum, thus reducing that portion of the tape pile load supported on the outer bearing ridges. This reduces the drag torque lever arm, decreasing tape tension.

The tape cartridge is also provided with a large spew chamber directly above the tape reel to accommodate excess operating loop length resulting from tape wear and drag variations.

BACKGROUND OF INVENTION

Several problems arise in the normal operation of conventional single reel magnetic tape cartridges. Principal among these are the maintenance of proper tape tension and operating loop length, to prevent tangling and to assure uniform and optimum tracking of the tape across the head of the playback transducer. Gradual changes in tape thickness due to wear, variations in drag forces, and vibration of cartridge components all contribute to fluctuations in tape tension and loop length.

With continued operation of the cartridge, the tape thickness gradually decreases from wear. As the spirally wound tape advances from the outer winding of the reel toward the center, both surfaces of the tape are in frictional sliding contact with adjacent windings, since the back tension in the rewinding tape causes the outer winding to rotate at a slower angular velocity than the innermost winding. This continuous relative shifting and sliding causes wear in the oxide and lubricant tape coatings, gradually reducing tape thickness. This reduction is naturally accompanied by a gradual decrease of the outside diameter of the tape pile. Less tape length is therefore required to wrap around the smaller diameter tape pile, thus producing greater length in the operating loop of the tape. Space must be provided for this slack tape in order to prevent it from becoming twisted in the mechanism.

Loop length and tension also fluctuate due to vibration and shock, particularly prevalent in the now popular vehicular installations of tape systems. Vibration induced excess loop length generally appears at start-up, from shock of cartridge insertion, or from mechanical problems, any of which cause instantaneous stopping and starting of the tape reel. Some manufacturers have found it necessary to apply a brake to the reel when the system is not in operation.

Reduction in tape reel mass lessens this vibration and shock problem. It has in the past been proposed to effect such a mass reduction by eliminating the reel platform, i.e., the annular radial flange integral with the lower portion of the tape hub on which the tape pile sits. Without a platform, the entire tape pile slides on the cartridge floor, producing a severe drag problem. Elimination of the platform also makes the initial factory winding of the tape onto the reel difficult with conventional winding equipment and methods.

To accommodate slack loop length, a limited size spew or spill chamber has been available in the front portion of some 8-track tape cartridges. No chamber has been possible with 4-track cartridges, because the "tire well" wall, which must surround the well and slot through which the player-mounted pinch wheel or tire pivots into the cartridge, blocks tape access to any available space. Previous attempts to design a compatible 4 and 8-track cartridge have not been able to overcome this tire well wall problem, especially where the cartridge is loaded with a 400 foot tape which further blocks any access to spew chamber space between the back side of the tire well and the tape reel.

DETAILED DESCRIPTION

Figure 1:
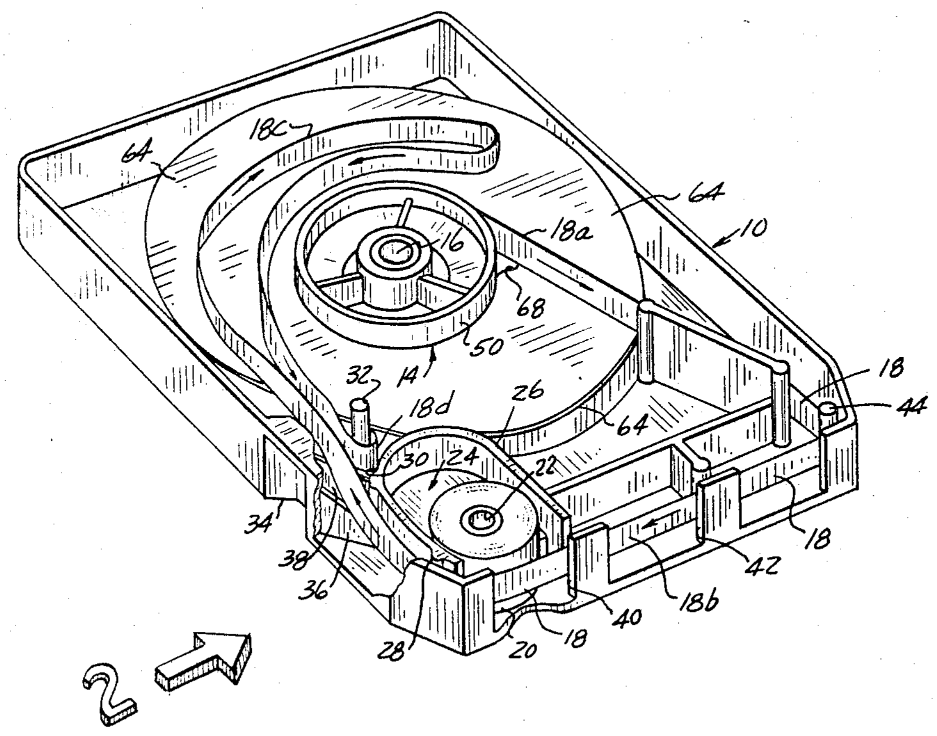
FIG. 1 is a perspective of the base of the 8-track cartridge of this invention, with the cover removed to reveal the inner structure, viewed in the direction of arrow 1 of FIG. 3.

Referring now to FIG. 1, there is illustrated the assembled cartridge base 10 from which cartridge cover 12 has been removed.

In general, the single reel cartridge of this invention comprises a tape reel assembly 14 rotatably mounted on spindle 16 of cartridge base 10. Reel 14 may be spirally wound with up to 400 feet of magnetic tape 18.

Pinch roller or tire 20 is rotatably mounted on spindle 22 of cartridge base 10. Pinch roller 20 lies within tire well 24 defined by tire well wall 26. The outer face of wall 26 is provided with a pair of vertical tape guide ribs 28 and 30. A tape guide post 32 is located just behind tire well 24.

In this same area is a detent recess 34 in the side wall of the cartridge. This recess cooperates with a spring latch mechanism of this player to lock the cartridge in place after insertion in the player.

A pair of inclined vertical guide ramps 36 and 38 are integrally formed with the cartridge base and traverse the slot between the wall of recess 34 and tire well wall 26. The top face or roof of recess 34 may also be inclined in the same direction.

A pair of slots are provided in the front edge of the cartridge. Slot 40 permits access to the capstan of the player, while slot 42 receives the transducer head of the player. As is well known, the capstan pinches tape 18 against tire 20 and drives the tape.

Further tape guide posts 44 and 46 are provided in the front of the cartridge.

Figure 3:
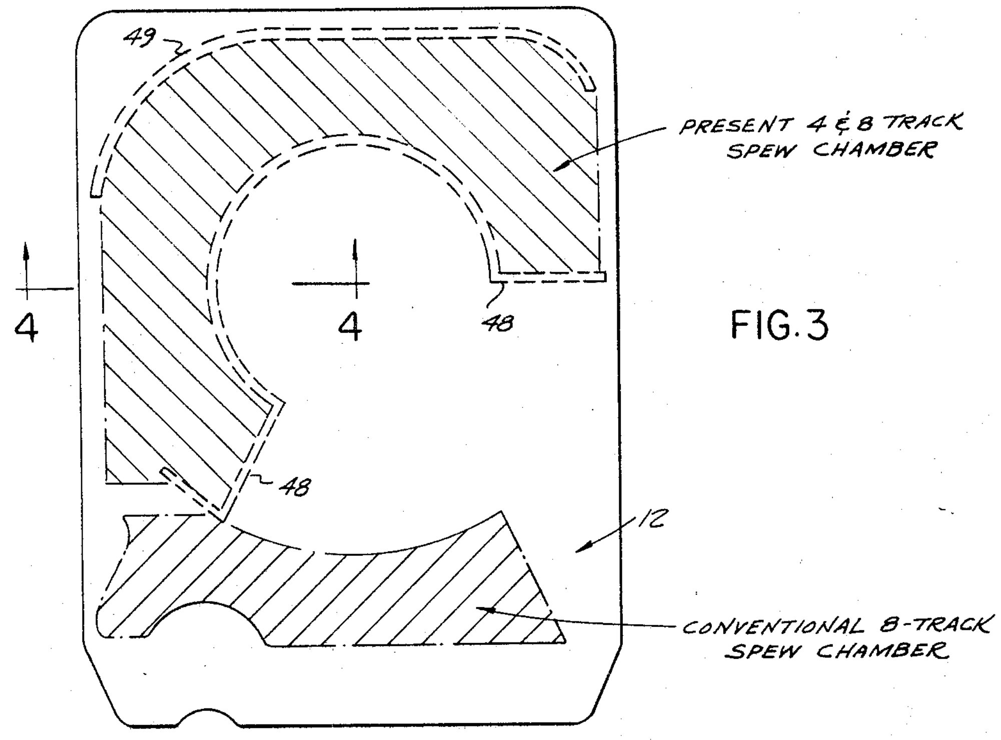
FIG. 3 is a simplified and schematic plan view of the cartridge cover.

Integral with the underside of cartridge covers 12 are vertical spew chamber barriers 48 and 49, illustrated in dotted lines in FIG. 3.

Figure 4:
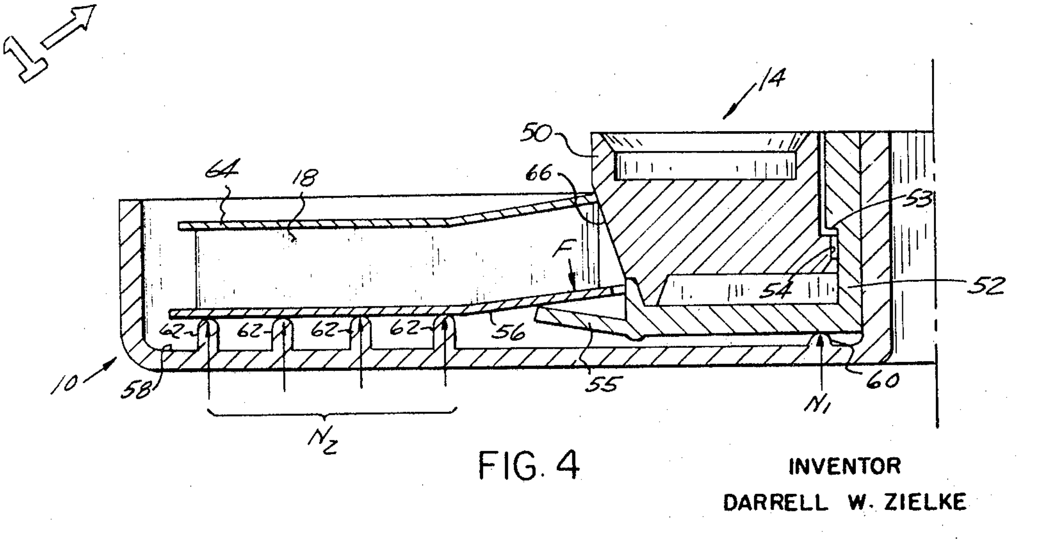
FIG. 4 is a sectional elevation of the tape reel assembly viewed in the direction of arrows 4—4 of FIG. 3.

Referring now to FIG. 4 of the drawings, one half of tape reel assembly 14 is shown, comprising tape cone 50 and hub 52. These two components, which are preferably plastic, may be fused or pressed together by any desired process. Alternatively, the outside diameter of the spindle portion of hub 52 may be provided with a shoulder or step at 53 which cooperates with a narrowed neck portion 54 on the internal diameter of cone 50 to form a snap fit. Once neck 54 has been pressed past shoulder 53, relative rotation between the cone 50 and hub 52 is possible. As a second alternative, a simple slip or running fit could be provided between cone 50 and hub 52.

The lower outer edge of tape hub 52 is provided with an inclined radial flange 55. A substantially rigid Mylar annular wafer 56 is supported on flange 55, and is placed thereon prior to the assembly of tape cone 50 to hub 52. The I.D. of wafer 56 may be less than the O.D. of cone 50 so that, once assembled, wafer 56 may not fall off the reel during handling.

The floor 58 of cartridge base 10 is provided with a series of upstanding bearing ridges concentric with tape spindle 16. Inner bearing ridge 60 supports the tape reel assembly 14, while the four outer bearing ridges 62 support the outer portion of wafer 56 and tape 18.

Resting on top of the tape pile is a thin Mylar separator 64, which serves to gently hold the tape down while permitting some upward displacement, and to isolate this revolving mass from the spew chamber above, as will be described.

OPERATION

The desired cartridge is selected and inserted into a receiving slot in the tape player. The cartridge is locked in place by a spring detent mechanism which engages detent recess 34 in the side of the cartridge base 10. In this position, the driving capstan of the player and the pinch roller 20 of the cartridge cooperate to firmly grip tape 18 therebetween, thereby providing the necessary tension in the tape to unwind it from reel 14.

Tape 18 is continuously pulled off of the innermost winding of the reel, and returned onto the outermost winding of the reel, as is conventional.

The path of tape 18 is as follows. The tape tension supplied by the capstan and pinch roller 20 causes the tape to be pulled off of the innermost winding of the reel at 18*a*. To facilitate the smooth exit of the tape from the reel the outer face of tape cone 50 is provided with a conical surface at 66 (see FIG. 4). A slot 68 is provided at the inner edge of separator 64 (FIG. 1) to provide a path for the tape upward through the separator.

The tape passes from reel 14 to guide posts 44 and 46 and then to pinch roller 20. The inward pressure applied to the tape at 18*b* by the head of the player is resisted by guide post 46. As the tape leaves pinch roller 20, it bears against guide ribs 28 and 30 on the outside face of tire well wall 26. From there it normally passes downwardly past the right hand side of guide post 32 (FIG. 1) and under separator 64 at 18*d* onto the outer winding of the reel.

It will be understood by those skilled in the art that rotation of reel 14 is caused by the friction between the tape and the reel. It is this rotation of the reel and the difference in input and output diameters of the tape pile which cause the tape to be wound back onto the reel as it leaves pinch roller 20.

SPEW CHAMBER

During operation of the cartridge, the length of the operating loop, that is, the length of tape between points 18*a* and 18*d*, is subject to variation as discussed above. The buildup occurs between pinch roller 20 and the outermost winding of the reel. Space must be provided for this excess length so that the tape does not become tangled, snarled and damaged.

When excess length forms, the tape path changes in the unique cartridge configuration of this invention. Instead of passing directly from guide rib 30 to guide post 32, the buildup of tape between these two points begins to climb the inclined ramps or ribs 36 and 38, until it passes up onto the top face of separator 64 and recess 34 at 18*c*.

Once this condition has been established, continued accumulation of excess loop length spews or spills into the large spew chamber located above the tape pile, as defined by spew chamber barrier 48 in tape cover 14. The excess loop remains there until the transient disturbance-induced uneven spacing between adjacent pile windings is equalized and the excess loop taken up.

Figure 2:
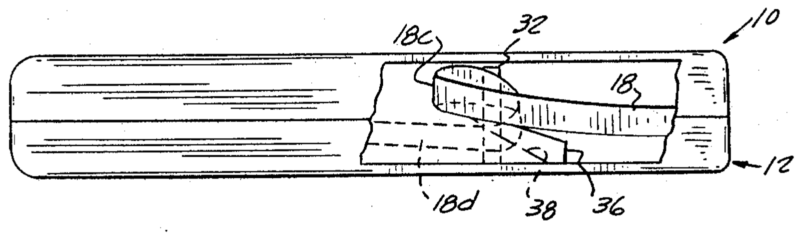
FIG. 2 is a side elevation of the assembled cartridge viewed in the direction of arrow 2 of FIG. 1, with a portion of the cartridge case broken out.

It will be observed from FIGS. 1 and 2 that the elevation of tape 18 as it comes off pinch wheel 20 is intermediate that of the tape pile and the spew chamber. Thus, only a slight vertical displacement of the tape is necessary to shift up to the spew chamber.

As shown in FIG. 3, the spew chamber is defined by the outer walls of cover 12 and barrier 48. This entire shaded area ("Present Chamber") is available for this purpose, compared with the much smaller shaded area ("Conventional Chamber") heretofore available only in some 8-track cartridge models.

TAPE TENSIONING

Operation of the unique tape tensioning adjustment feature of this invention can best be appreciated by reference to FIG. 4. When an increase in tape tension occurs in the system, this tape tension is felt throughout the entire tape pile, and exerts an inward force against the conical face 66 of tape hub 52. This force has a component which is represented by the vector labeled F in FIG. 4. It will be seen that this force exerted downwardly against the inner portion of Mylar wafer 56 causes the outer upper edge of hub flange 55 to act as a fulcrum, tending to rock the outer portion of wafer 56 upward. This produces a reduction in that portion of the weight of the tape pile which is supported on the four outer bearing ridges 62 at $N_2$.

Reduction in normal force $N_2$ causes an accompanying increase in that portion of the weight of the tape pile and reel assembly which is supported on inner bearing ridge 60 at $N_1$. This shift in the distribution of the normal force causes a reduction in the total drag moment which exists between the tape reel and pile assembly and the five bearing ridges. With this reduction in drag in the system, the tension in the system is thereby reduced automatically in response to an increase in the tape tension.

The tensioning feature permits previously used pressure pads in the vicinity of the head to be eliminated if desired. The drag previously introduced by pressure pads has been replaced by that occurring at $N_2$. This automatic tension-adjusting feature, plus the back tension in the tape between pinch roller 20 and the input winding of the tape pile produces the desired uniform head wrap of tape against the transducer head. Not only does this unique reel level out large changes in tape pullout tension, but it also produces a constant low drag system and effects a substantial reel mass reduction without losing the benefits of the formerly used reel platform.

It will be appreciated that the spew chamber and tape tensioning features of this unique cartridge is entirely compatible with both 4-track and 8-track systems. The only conversion required in the cartridge is to eliminate the pinch roller spindle 22 and add a cut-out in the bottom of tire well 24. This can be cheaply and readily accomplished by means of inserts in the molding dies.

By permitting relative rotation between the tape cone 50 and hub 52, the rotational speed of the cone may more nearly approximate that of the innermost tape winding. This reduces tape wear and small variations in pullout tension known as flutter.

This invention may be further developed within the scope of the following claims. Accordingly, the above description is to be interpreted as illustrative of only a single operative embodiment of this invention, rather than in a strictly limited sense.

I now claim:

1. In a single reel magnetic tape system characterized by a cartridge containing a reel spirally wound with an endless loop of magnetic tape, the tape reel having a loop of tape projecting therefrom for engagement with a tape driving means and a recording playback transducer means, the projecting loop being joined with the innermost and outermost windings of the reel-wound tape, the tape driving means applying tension to the projecting loop to feed the tape off of the innermost winding of the reel and past the transducer, and the rotating tape reel winding the projecting loop back onto the outermost winding, the improved cartridge and reel assembly which comprises:

a spindle projecting upwardly from the floor of the cartridge;

a tape reel rotatably mounted on said spindle within the cartridge, said reel having a short radial flange projecting outwardly from the bottom face thereof, the upper outer peripheral edge of said flange projecting upwardly from the remainder of said flange;

a first annular bearing ridge means projecting upwardly from the floor of the cartridge, concentric with said spindle and spaced at a relatively small radius therefrom, so as to be positioned beneath the hub of said reel, the weight of said reel being fully supported on said first bearing ridge means;

second annular bearing ridge means projecting upwardly from the floor of the cartridge, concentric with said spindle and spaced at a relatively large radius therefrom so as to lie beyond said reel flange, said second ridge means being of a uniform elevation relative to the cartridge floor, which elevation is slightly below the elevation of said upper outer edge of said reel radial flange when said reel is positioned on said spindle and resting on said first bearing ridge means;

a thin, substantially rigid annular tape-supporting wafer concentric with said reel, said wafer normally being supported on said upper outer edge of said reel radial flange and on said second bearing ridge means, the top face of said wafer serving as a bearing surface and support for the spirally-wound tape pile, the weight of said tape pile being ultimately supported solely on said first and second bearing ridge means;

whereby increased tension in the tape causes the portion of said wafer lying inwardly of said flange outer edge to be cammed downwardly by the tape pile, and said flange upper outer edge acting as a fulcrum tending to lift the balance of said wafer upward to reduce the portion of the tape pile weight which is supported by said second bearing ridge means.

2. In a single reel magnetic tape system characterized by a cartridge containing a reel spirally wound with an endless loop of magnetic tape, the tape reel having a loop of tape projecting therefrom for engagement with a tape driving means and a recording playback transducer means, the projecting loop being joined with the innermost and outermost windings of the reel-wound tape, the tape driving means applying tension to the projecting loop to feed the tape off of the innermost winding of the reel and past the transducer, and the rotating type reel winding the projecting loop back onto the outermost winding, the improved cartridge and reel assembly which comprises:

a tape spew chamber within the cartridge and directly above the tape reel and separated therefrom by a plate;

tape guiding means located in the normal tape path between the tape-driving means and the point at which the rewinding tape enters the tape reel, said guiding means comprising inclined ramp means which are normally bypassed by the tape when there is no excess tape loop length, but against which the tape impinges as excess tape loop length begins to form, said ramp means serving to cam the excess tape upwardly from its normal path into said spew chamber.

3. An improved magnetic tape reel for use in single reel systems comprising:

a central apertured hub adapted to be rotatably mounted upon a spindle, the outside diameter of said hub being an inverted truncated cone;

a radial flange projecting from the entire lower periphery of said hub, said flange being so configured that its outer upper peripheral edge is slightly higher than any other point on said flange;

and a thin substantially rigid annular wafer concentric with said hub and freely supported on said hub flange, said wafer having an outside diameter sufficiently large to provide full support for a tape pile spirally wound about said hub.

4. The reel of claim 3 wherein said hub is of two-piece construction and wherein said wafer has an internal diameter less than the maximum diameter of said conical surface and of said hub flange, whereby once said wafer is assembled to said hub it cannot be removed.

5. The reel of claim 3 wherein said hub is of two-piece construction and wherein said conical surface portion of said hub may rotate relative to said radial flange portion of said hub.

6. The reel of claim 1 which further comprises an inverted truncated conical hub portion about which the tape is spirally wound, said conical hub portion being capable of rotation relative to said radial flange portion of said hub.

References Cited

UNITED STATES PATENTS

| | | | |
|---|---|---|---|
| 2,837,332 | 6/1958 | Busch | 242—55.19 |
| 3,252,670 | 5/1966 | Smith | 242—55.19 |
| 3,322,360 | 5/1967 | Roys | 242—55.19 |

BILLY S. TAYLOR, *Primary Examiner.*

U.S. Cl. X.R.

242—71.8